US008643719B2

(12) United States Patent
Vian et al.

(10) Patent No.: US 8,643,719 B2
(45) Date of Patent: Feb. 4, 2014

(54) TRAFFIC AND SECURITY MONITORING SYSTEM AND METHOD

(75) Inventors: John Lyle Vian, Renton, WA (US); Ali Reza Mansouri, Bothell, WA (US); Emad William Saad, Renton, WA (US)

(73) Assignee: The Boeing Company, Chicago, IL (US)

( * ) Notice: Subject to any disclaimer, the term of this patent is extended or adjusted under 35 U.S.C. 154(b) by 1411 days.

(21) Appl. No.: 12/124,511

(22) Filed: May 21, 2008

(65) Prior Publication Data

US 2009/0219393 A1 Sep. 3, 2009

Related U.S. Application Data

(60) Provisional application No. 61/032,609, filed on Feb. 29, 2008, provisional application No. 61/032,624, filed on Feb. 29, 2008.

(51) Int. Cl.
*H04N 7/18* (2006.01)
*G01C 22/00* (2006.01)

(52) U.S. Cl.
USPC ............. 348/144; 348/143; 348/148; 701/23; 701/26

(58) Field of Classification Search
USPC ....................... 348/143, 144, 148; 701/23, 26
See application file for complete search history.

(56) References Cited

U.S. PATENT DOCUMENTS 5,340,056 A * 8/1994 Guelman et al. ............. 244/3.16
2005/0122914 A1* 6/2005 Durso et al. .................. 370/270
2006/0085106 A1* 4/2006 Gaudiano et al. ............... 701/23
2006/0184292 A1* 8/2006 Appleby et al. ................ 701/23
2007/0041336 A1* 2/2007 Wan et al. ..................... 370/256
2008/0033684 A1 2/2008 Vian et al.

OTHER PUBLICATIONS

Valenti, M.; Bethke, B.; How, J.P.; De Farias, D.P.; Vian, J., "Embedding Health Management into Mission Tasking for UAV Teams," American Control Conference, 2007. ACC '07 , vol. No. pp. 5777,5783, Jul. 9-13, 2007.*

Bethke, B.; Valenti, M.; How, J.P., "UAV Task Assignment," Robotics & Automation Magazine, IEEE , vol. 15, No. 1, pp. 39,44, Mar. 2008.*

* cited by examiner

*Primary Examiner* — Lynn Feild
*Assistant Examiner* — Taylor Elfervig
(74) *Attorney, Agent, or Firm* — Harness, Dickey & Pierce, P.L.C.

(57) ABSTRACT

A method for monitoring a geographic area that using a plurality of unmanned mobile vehicles. Each unmanned mobile vehicle may be programmed with an operational plan to cover a specific subregion of said geographic area. Each unmanned mobile vehicle may be used to obtain visual images of its associated said subregion during operation. A surveillance system is also disclosed for monitoring a geographic area. The system includes a plurality of autonomously operated unmanned mobile vehicles. Each vehicle includes an onboard system that executes an operational plan to enable the vehicle to traverse a specific subregion of the geographic area. Each onboard system further includes a monitoring system to obtain visual images of its associated subregion.

20 Claims, 5 Drawing Sheets

TRAFFIC AND SECURITY MONITORING SYSTEM AND METHOD

CROSS-REFERENCE TO RELATED APPLICATIONS

This application takes priority from U.S. Patent Application Nos. 61/032,609 filed Feb. 29, 2008, and 61/032,624 filed Feb. 29, 2008. The disclosures of the above applications are incorporated herein by reference.

This application is related in general subject matter to U.S. patent application Ser. No. 12/124,565, filed May 21, 2008 and assigned to the Boeing Company. This disclosure of this application is incorporated herein by reference.

FIELD

The present disclosure relates to systems and methods for traffic and security monitoring, and more particularly to autonomous or semi-autonomous systems that are able to monitor mobile or fixed objects over a wide geographic area.

BACKGROUND

The statements in this section merely provide background information related to the present disclosure and may not constitute prior art.

There is a growing desire to be able to monitor, in real time, predefined geographic areas for security purposes. Such areas may include battlefield areas where military operations are underway or anticipated, border areas separating two countries, or stretches of highways or roads. Areas where large numbers of individuals might be expected often are also in need of security monitoring. Such areas may involve, without limitation, stadiums, public parks, tourist attractions, theme parks or areas where large groups of individuals might be expected to congregate, such as at a public rally. In many applications involving security monitoring, it is important to be able to quickly detect unauthorized activity or the presence of unauthorized persons, vehicles or even suspicious appearing objects within the area being monitored. However, present day monitoring and surveillance systems suffer from numerous limitations that can negatively impact their effectiveness in providing real time monitoring of large geographic areas or areas densely populated with individuals, vehicles or objects.

Present day monitoring and surveillance systems often employ static cameras to image various predetermined geographic areas. However, due to their relatively large size or because of physical obstacles that may be present in their fields of view, such static cameras may have limited effectiveness in many applications. Also, persistent monitoring of predefined geographic areas with static cameras can be difficult for long periods of time, as such cameras may require periodic maintenance or inspection for ensure their operation. By "persistent" monitoring it is meant continuous, real time (i.e., virtually instantaneously) monitoring. Static cameras provide limited field-of-view, and therefore monitoring a large area, such a long highway or a border crossing area, may require prohibitively large numbers of cameras to be used, thus making their use cost prohibitive. When deployed as fixed monitoring devices in challenging environments such as in deserts or in areas where extreme cold temperatures are present, then protecting the cameras from long term exposure to the elements also becomes a concern, and such extreme weather conditions may also affect the reliability or longevity of the expensive cameras.

Fixed static cameras often are not easily adaptable to changes in surveillance requirements. For example, situations may exist, such as on a battlefield, where the geographic area to be monitored may change from day to day or week to week. Redeploying statically mounted cameras in the limited time available may be either impossible, difficult, or even hazardous to the safety of workers or technicians that must perform such work.

Human piloted helicopters with onboard mounted cameras have also been used for airborne surveillance and monitoring purposes. However, while human piloted helicopters can provide visual monitoring of large areas, they are nevertheless quite expensive in terms of asset cost (helicopter), operational cost (pilot salary) and maintenance costs. In addition monitoring duration may be limited by the available number of pilots and helicopters. Still further piloted helicopters may not be able to fly during in inclement weather conditions. Even flying of human piloted helicopters at night adds an additional degree of hazard to the pilot(s) flying such missions. Still further, the limited fuel carrying capacity of a remotely piloted helicopter makes such a vehicle generally not as well suited to covering large geographic areas, such as geographic borders between two countries.

Remote controlled (RC) helicopters are lower in cost than piloted helicopters but still require a trained RC pilot for each RC helicopter. Thus, monitoring a large area with multiple RC helicopters may require a large number of expensive, trained RC pilots. In addition, the monitoring duration is limited by the available number of RC trained pilots and RC helicopters. Remote controlled (RC) helicopters require trained RC pilots and thus monitoring a large area with multiple helicopters requires a large number of expensive trained RC pilots and operators. This can be especially costly if persistent monitoring is required (i.e., essentially round-the-clock real time monitoring) of an area needs to be performed. Also, RC helicopters can only fly within line-of-sight (LOS) of its associated RC pilot.

Even with static cameras, human piloted helicopters, RC helicopters or other types of RC vehicles, if one camera becomes inoperable, or if one vehicle has to land or is lost to a hostile action by an enemy, then it may be difficult or impossible for the remaining static cameras, or the remaining airborne vehicles (piloted or RC) to accomplish the needed surveillance of the geographic area being monitored. This is especially so with fixedly mounted cameras. Because of practical limitations with human piloted helicopters, e.g., fuel supply or pilot fatigue, the remaining airborne helicopters may not be able to cover the geographic area of the lost helicopter. The same limitations of RC pilot fatigue may exist with RC helicopters, and thus limit the ability of the remaining, airborne RC helicopters to cover the area of the lost RC helicopter.

Still further, if one RC vehicle must land because of a mechanical problem or lack of fuel, the task of having a ground crew reorganize the responsibilities of the remaining RC vehicles may be too detailed and extensive to accomplish in a limited amount of time. This could be particularly so in a battlefield environment, or possibly even in a stadium monitoring application. In such situations, the need for a ground crew to immediately change the flight responsibilities of the remaining RC vehicles and re-deploy them in a manner that enables them to carry out the monitoring task at hand presents a significant challenge.

SUMMARY

The present disclosure involves a monitoring method for monitoring a geographic area using a plurality of unmanned mobile vehicles, programming each of the unmanned mobile vehicle with an operational plan to cover a specific subregion of said geographic area, and using each unmanned mobile vehicle to obtain visual images of its associated subregion during operation.

Another method for monitoring a geographic area involves using a plurality of airborne unmanned mobile vehicles; programming each airborne unmanned mobile vehicle with an operational plan to cover a specific subregion of the geographic area; using each airborne unmanned mobile vehicle to obtain visual images of its associated subregion during operation of said airborne unmanned vehicle; causing each airborne unmanned mobile vehicle to wirelessly transmit said images it obtains to a centralized monitoring station; and viewing each of the images on a display at the centralized monitoring station.

A surveillance system is also disclosed for monitoring a geographic area. The system comprises a plurality of autonomously operated unmanned mobile vehicles. Each of the unmanned mobile vehicles includes a flight control system that executes an operational plan to enable each unmanned mobile vehicle to traverse a specific subregion of the geographic area. Each unmanned mobile vehicle includes a monitoring system to obtain visual images of its associated subregion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
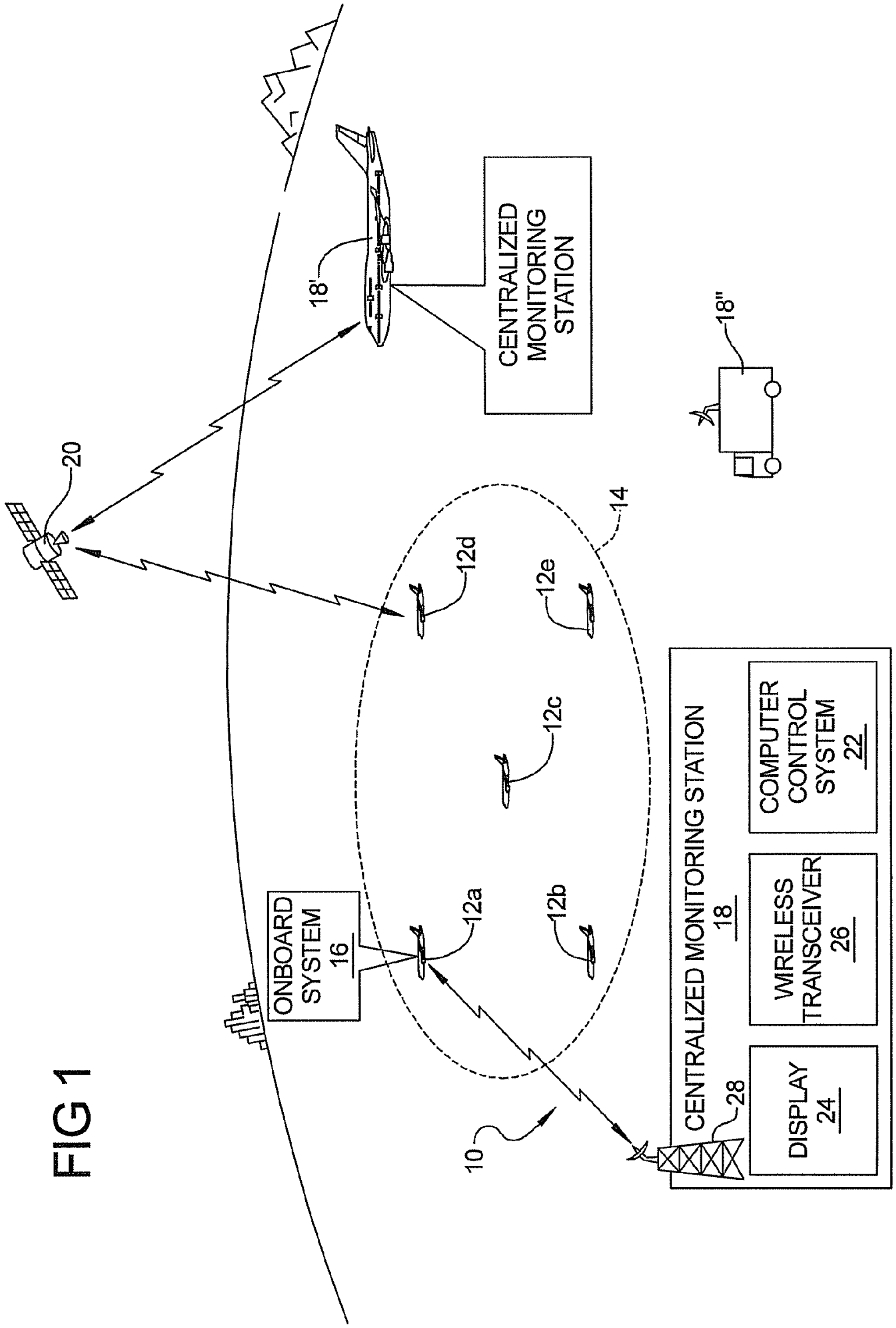
FIG. 1 is a high level block diagram of a system in accordance with one embodiment of the present disclosure.

Referring to FIG. 1, there is shown a surveillance system 10 in accordance with one embodiment of the present disclosure. The surveillance system 10 (hereinafter the "system 10") may comprise a plurality of completely autonomous or semi-autonomous airborne unmanned vehicles 12*a*-12*e* (hereinafter referred to so "UAV" or "UAVs") that fly over predetermined subregions of a predefined geographic area 14. This may be done to monitor activity of other vehicles, such as land vehicles, operating with the geographic area 14, or to monitor the activity of individuals within the geographic area 14. While five such UAVs 12*a*-12*e* are illustrated, it will be appreciated that a greater or lesser plurality of UAVs may be implemented as needed for a specific application or task. For covering a large geographic area, such as a border between two countries, several hundred, or even several thousand, UAVs 12 may be required.

It should also be appreciated that while the following discussion references airborne unmanned vehicles, that unmanned land vehicles, for example robots able to traverse even or uneven topography, or even unmanned motorized vehicles, are contemplated as being within the scope of the present disclosure. Furthermore, unmanned marine surface vessels, or even underwater, unmanned marine vehicles may be employed to carry out needed surveillance and/or monitoring in accordance with the present disclosure. Thus, the teachings presented herein should not be construed as being limited to only airborne vehicles.

Each UAV 12*a*-12*e* has an onboard system 16 that may be programmed with a flight plan to cause the UAV to fly in a predetermined path to repeatedly cover a particular subregion of the geographic area 14. As will be explained in greater detail in the following paragraphs, it is a particular advantage of the present system and method that, in one embodiment, the UAVs 12*a*-12*e* may each dynamically change their flight plans as needed in the event one of the UAVs 12 becomes inoperable for any reason. The flight plans are modified so that the remaining UAVs 12 cooperatively cover the subregion that was to be covered by the inoperable UAV. In this embodiment each UAV 12-12*e* is "autonomous", meaning that its onboard system includes the intelligence necessary to determine when one of the other UAVs 12 has become inoperable, specifically which one of the other UAVs 12 has become inoperable, and exactly what alternative flight plan it needs to implement so that the geographic area 14 can still be monitored by the remaining ones of the UAVs 12. In another embodiment of the system, the monitoring of operation of the UAVs 12, may be performed by a remote station and the UAVs 12 may each be informed via wireless communications when one of the UAVs has become inoperable. The UAVs 12 may then each determine the specific alternative flight plan that is needed so that the geographic area 14 can be covered using only the remaining UAVs 12. In this implementation, the UAVs 12 may be viewed as being "semiautonomous", meaning that a portion of their operation is controlled by a remotely located subsystem.

In either of the above implementations, the UAVs 12*a*-12*e* form what may be termed a "swarm" that is able to persistently cover the geographic region 14. By "persistently", it is meant that each UAV 12*a*-12*e* is able to continuously and repeatedly cover its assigned subregion, in real time, with a frequency of repetition appropriate the sensitivity of the application. For less sensitive applications, a frequency of repetition might be one complete flight through its assigned subregion every few hours, while a more sensitive monitoring application may require one complete flight through each subregion every 5-15 minutes. It will also be appreciate that the UAVs 12*a*-12*e* may be deployed from a terrestrial location such as an airfield or airport, or even from an airborne vehicle such as a transport rotorcraft or a cargo aircraft such as the Boeing built C-130 transport aircraft.

Referring further to FIG. 1, a terrestrial, centralized monitoring station 18 may be used to wirelessly receive information from the UAVs 12. Alternatively, the centralized monitoring station 18 may be formed on an airborne platform 18', such as a jet aircraft or a rotorcraft, or even on a mobile terrestrial vehicle 18". Still further, one or more satellites 20 may be used to transpond signals from any one or more of the UAVs 12 to any one of the centralized control stations 18 or 18' or 18". It is also contemplated that both the terrestrial centralized monitoring station 18 and one or more of the airborne centralized monitoring station 18' or the mobile terrestrial monitoring station 18" might be used simultaneously in highly important monitoring activities, with one forming a backup system for the other.

For convenience, the construction of centralized monitoring station 18 will be described. It will be understood that the construction of the airborne centralized monitoring system 18' and the terrestrial mobile centralized monitoring station 18" may be identical in construction to the centralized monitoring station 18, or may differ as needed to meet the needs of a particular application.

The centralized monitoring station 18 may include a computer control system 22, a display (e.g., LCD, CRT, plasma, etc.) 24, a wireless transceiver system 26 and an antenna 28. The computer control system 22 may be used to initially transmit mission plans to each of the UAVs 12*a*-12*e* prior to their deployment to monitor, via the antenna 28 and wireless transceiver system 26. The computer control system 22 may also be used to monitor communications from each of the UAVs 12 after their deployment. The communications may be used by the computer control system 22 to determine if any one or more of the UAVs 12 becomes inoperable for any reason, or suffers a component failure that prevents it from transmitting information regarding its monitoring activities. The computer control system 22 may also be used, via the wireless transceiver 26 and the antenna 28, to transmit messages or even alternative flight plan information to each UAV 12, after deployment, in the event of a failure of one of the UAVs 12. However, as explained above, in one embodiment this capability is present in the on-board system 16 of each UAV 12. Alternatively, a wide area network (not shown), or even a local area network, may be implemented that links each of the UAVs 12 with the centralized control station 18. In sensitive applications, it is expected that such a network will be a secure network.

The display 24 may be used by an individual (or individuals) to interpret information that is wirelessly received from the UAVs 12. The display may comprise one large screen (CRT, LCD, plasma, etc.) that simultaneously displays information from each of the UAVs 12, such as still picture or video information), or it may include appropriate controls to enable the operator to select information from a specific one or more of the UAVs 12 to be displayed. Still further, the display 24 could include appropriate software to enable the information received from the UAVs to be sequentially displayed for a few seconds at a time, with the display cycling to display the information from all of the UAVs 12 every so many minutes or hours, depending on how many UAVs 12 are deployed.

As will be described further in the following paragraphs, the centralized monitoring station 18 may be used to periodically receive structural health information from each of the UAVs 12 and to monitor the structural of each UAV. Provision may be made for the computer control system 22 to override the flight plan of any given UAV 12 if the system 22 determines that the UAV 12 or a subsystem thereof is not operating satisfactorily, and to send signals to the remaining UAVs to alert them which UAV 12 is not operating properly.

Figure 2:
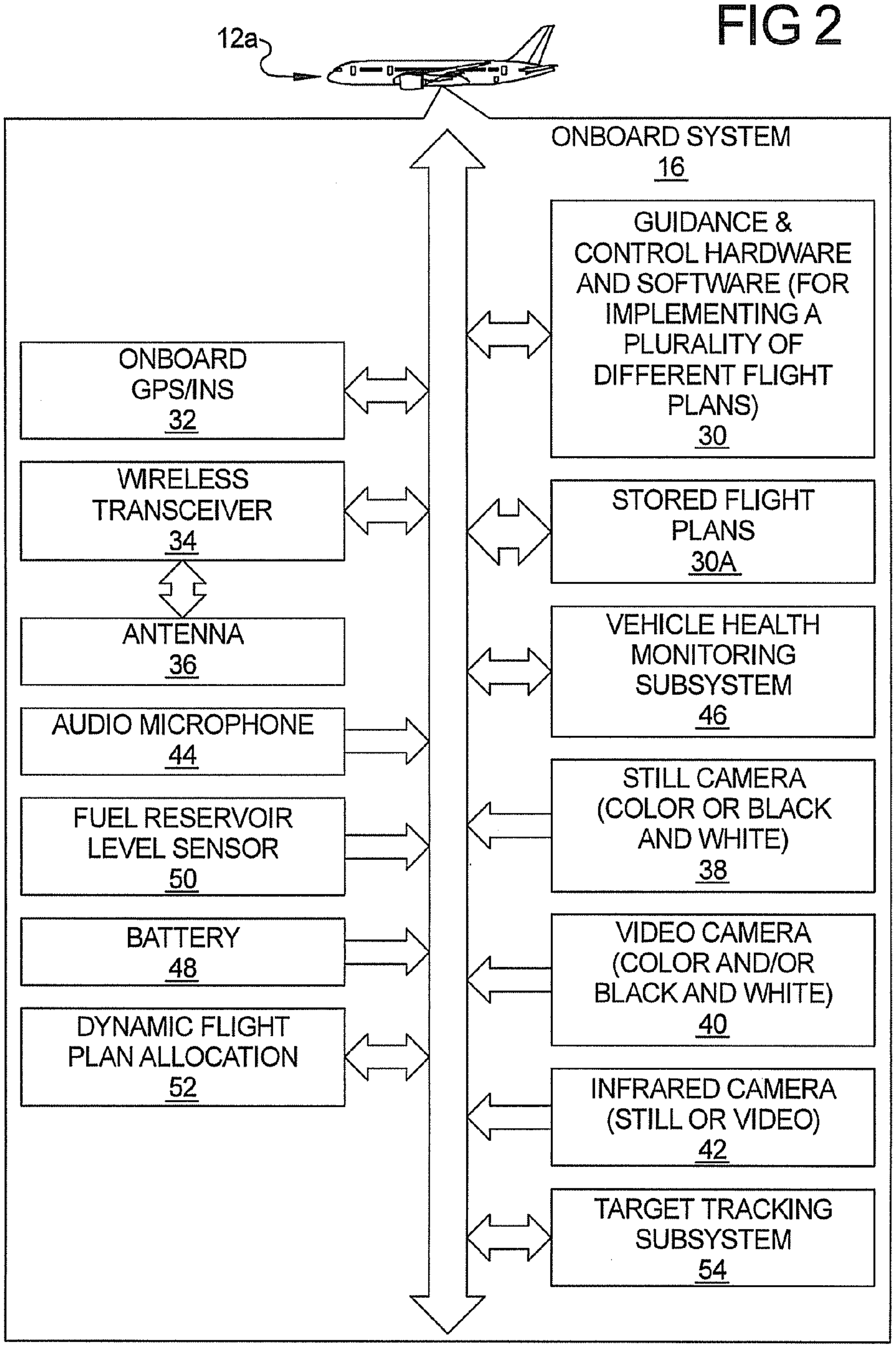
FIG. 2 is a block diagram of the components carried on each unmanned mobile vehicle.

Referring to FIG. 2, the onboard system 16 of UAV 12*a* is shown in greater detail. It will be appreciated that the onboard system 16 of each of the other UAVs 12*b*-12*e* may be identical in construction to that of UAV 12*a*, or may differ slightly as needed per a specific application. The onboard 16 may include guidance control hardware and software for storing and executing one of a plurality of different stored flight plans. An onboard GPS/INS (Global Positioning System/Inertial navigation system) 32 may be used by the UAVs guidance control hardware and software 30 to form a closed loop system that enables the UAV 12*a* to carry out a given flight plan. A wireless transceiver 34 and an antenna 36 enable the UAV to wirelessly transmit information it generates to the centralized monitoring station 18, and to receive communications from the centralized monitoring station 18. If the UAV 12 is operating in an autonomous mode, the wireless transceiver and antenna 36 may be used to generate and receive beacon signals or other wireless communications from the other UAVs 12*b*-12*e* to monitor their operation and detect if one or more becomes inoperable. In this regard, the detection of an inoperable UAV 12*b*-12*e* may be inferred by the absence of a periodic beacon signal, or possibly by a coded signal sent by the malfunctioning UAV 12 that informs UAV 12*a* that one or more of its subsystems has become inoperable. In such an instance, the UAV 12 uses its guidance control hardware and software to implement an appropriate alternative flight plan that allows the remaining UAVs 12 to cover the subregion that would have been covered by the inoperable or malfunctioning UAV 12.

The onboard system 16 may include virtually any form of sensor, and number or sensors, that is/are physically able to be carried by the UAV 12*a*. In this exemplary embodiment, the onboard system 16 may include one or more of a still camera 38 that is able to take color or black and white images, a video camera 40 that is able to generate streaming video in color or black and white, and an infrared sensor 42 that is able to generate still images or streaming infrared video. As mentioned above, this information may be transmitted directly to the centralized monitoring station 18 or via a wide area network or local area network that links the monitoring station 18 with each of the UAVs 12*a*-12*e*. Optionally, an audio pickup device such as an audio microphone 44 may be employed to pick up audio signals in a given subregion being traversed by the UAV 12.

The onboard system 16 may also include a vehicle structural health monitoring subsystem 46 that monitors the available power from an onboard battery 48 and a fuel reservoir 50, as well as the operation of the sensing devices 38-44. The health monitoring device may generate periodic signals that are transmitted by the UAV 12*a* to the other UAVs 12*b*-12*e* or to the centralized monitoring station, depending whether the UAVs 12*a*-12*e* are operating in the fully autonomous mode or the semiautonomous mode.

With further reference to FIG. 2, the onboard system 16 may include a dynamic flight allocation subsystem 52 and a target tracking subsystem 54. The dynamic flight allocation subsystem 52 may operate with the guidance and control hardware and software 30 to dynamically assign a new flight plan to each UAV 12*a*-12*e* in the event one of the UAVs becomes inoperable. By "dynamically" it is meant essentially instantaneously or in real time, without the need for any commands or control from the centralized monitoring station 18. However, the centralized monitoring station may optionally be provided with the capability to override a dynamically assigned flight plan for any one or more of the UAVs 12*a*-12*e*. This capability may be desirable in the event that an individual at the centralized monitoring station learns of a condition or circumstance that makes it desirable to deviate from the preprogrammed flight plans carried by each UAV 12. In this instance, the centralized monitoring station 18 may send a wireless signal to one or more of the UAVs 12*a*-12*e* with a new flight plan.

The target tracking subsystem 54 may be used to enable any one or more of the UAVs 12*a*-12*e* to perform real time analysis of objects or targets being monitored and to lock on and begin tracking a specific object or target, once such object or target is detected. For example, the target tracking subsystem 54 of UAV 12*a* may be used to enable UAV 12*a* to recognize a specific type of military vehicle, for example a flat bed truck that could be used to carry a mobile missile launcher. Alternatively, the target tracking subsystem 54 may enable the UAV 12*a* to detect a certain type of object, for example a backpack or brief case, being carried by one of many individuals moving about within a predetermined region being monitored by all the UAVs 12*a*-12*e*. In this instance, the target tracking subsystem 54 communicate with the guidance and control hardware and software 30 and the dynamic flight plan allocation subsystem 52 to inform these subsystems that it has detected a object that requires dedicated tracking, and UAV 12*a* would be thereafter be used to track the detected object. This information would be wirelessly communicated in real time to the remaining UAVs 12*b*-12*e* via the transceiver 34 and antenna 36 of the UAV 12*a*. The remaining UAVs 12*b*-12*e* would each use their respective dynamic flight plan allocation subsystem 52 and guidance control hardware and software 30 to dynamically determine a new flight plan needed so that the geographic region could still be completely monitored by the remaining UAVs 12*b*-12*e*.

Figure 3:
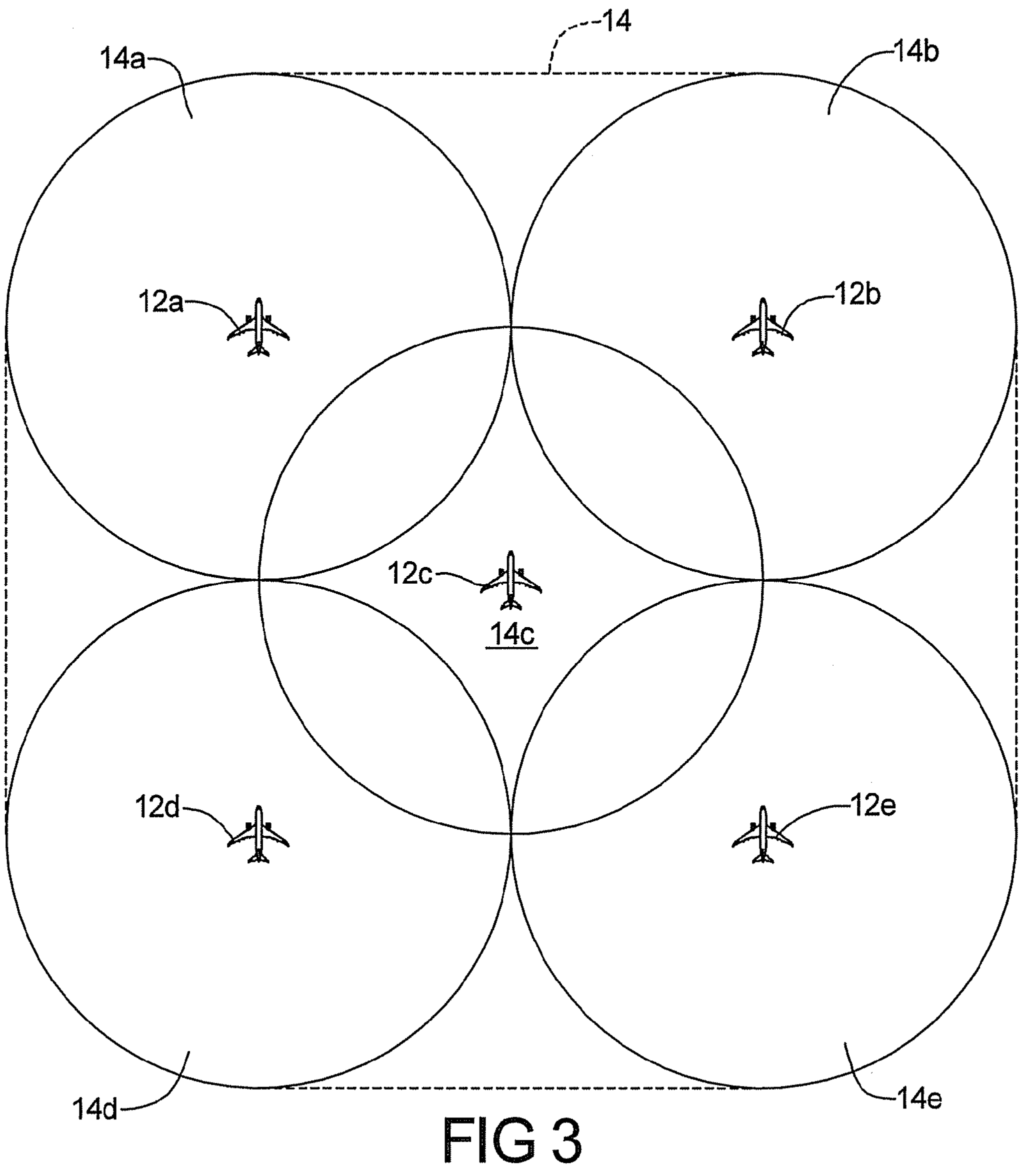
FIG. 3 is a diagram illustrating how five of the unmanned mobile vehicles may be programmed to cover five subregions of an overall geographic region, and where the subregions are defined to overlap slightly.
Figure 4:
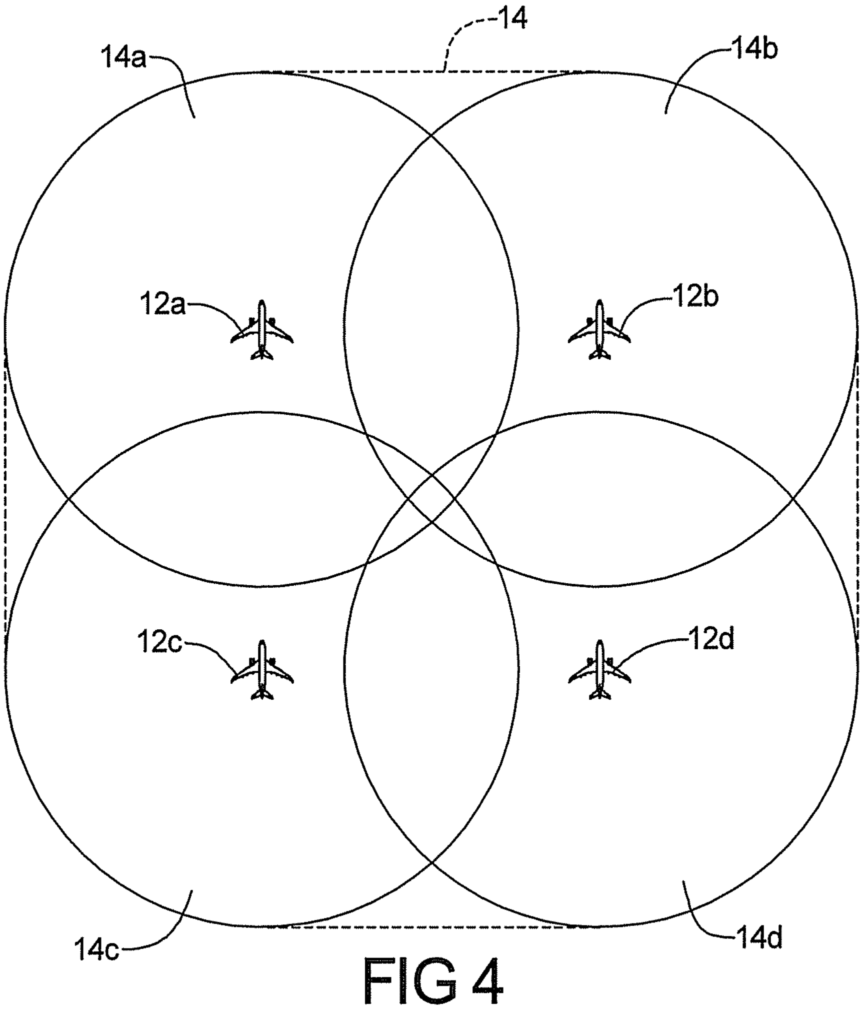
FIG. 4 illustrates how four of the unmanned mobile vehicles may be reprogrammed cover the five subregions in the even one of the unmanned mobile vehicles becomes inoperative.

Referring now to FIGS. 3 and 4, FIG. 3 shows how the geographic area 14 may be divided into a plurality of five independent but slightly overlapping subregions 14*a*-14*e*. In this example, under normal operation, UAVs 12*a*-12*e* would traverse subregions 14*a*-14*e*, respectively, in accordance with their respectively programmed flight plans. FIG. 4 illustrates how the subregions might be altered in the event, for example, that UAV 12*e* becomes inoperable. In this instance the dynamic flight plan allocation subsystem 52 and the guidance and control hardware and software 30 of each of the UAVs 12*a*-12*d* may dynamically select and implement an alternative flight plan that enables the four remaining UAVs 12*a*-12*d* to cover the entire geographic region most efficiently. If the UAVs 12-12*e* were all operating in the fully autonomous mode, then this action would be performed in real time without any involvement of the centralize monitoring station 18. If the UAVs 12*a*-12*e* were operating in the semiautonomous mode, then the computer control system 22 may send the necessary commands to the onboard system 30 of each of the remaining UAVs 12*a*-12*d* to accomplish selecting the needed flight plan. In either implementation, the overall geographic region 14 effectively becomes divided into four subregions (in this example four equal area subregions) that are then traversed by the remaining UAVs 12*a*-12*d*. It will be appreciated, however, that the newly formed subregions 14*a*-14*d* need not be equal in area. For example, if UAV 12*b* is low on fuel, or its health monitoring system indicates that its onboard battery 48 is low, the new flight plans for the remaining UAVs 12*a*-12*d* could be selected to provide a smaller subregion for UAV 12*b* than what would be covered by the remaining UAVs 12*a*, 12*c* and 12*d*. In this instance UAV 12*b* would communicate appropriate signals to the other UAVs to indicate its compromised operational status.

In the various embodiments of the system 10, the vehicle structural health monitoring subsystem 46 is able to help assist its UAV 12 in providing persistent monitoring capability. More specifically, the structural health monitoring subsystem 46 may monitor the operations of the various sensors and components of its associated UAV 12, as well as fuel usage and fuel remaining and battery power used and/or battery power remaining. The structural health monitoring subsystem 46 may also be used predict a distance or time at which refueling will be required, determine refueling station options and availability, and the location of a replacement vehicle that may be needed to replace the UAV 12 it is associated with, if a problem has been detected. The high degree of persistence provided by the structural health monitoring subsystem 46 enables the UAVs 12 to maximize their mission capability by taking into account various operational factors of each UAV 12 that maximizes the time that the UAVs 12 can remain airborne (or operational if ground vehicles are used).

Figure 5:
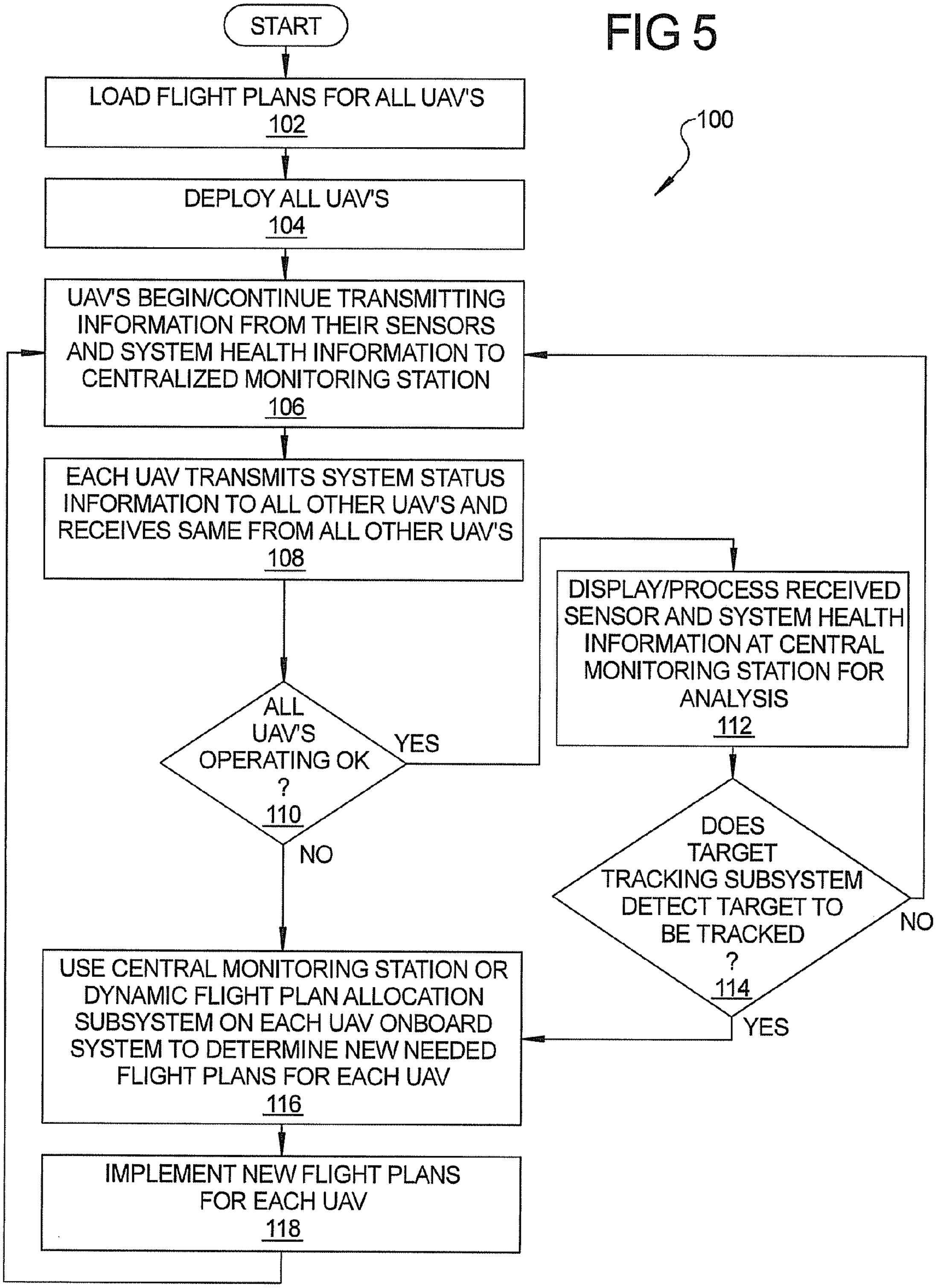
FIG. 5 is a flowchart illustrating the operations in performing a surveillance operation in accordance with one implementation of the teachings of the present disclosure.

Referring now to FIG. 5, a flowchart 100 is illustrated that sets forth major operations that may be performed by the methodology of the present disclosure. At operation 102 the flight plans for each of the UAVs 12-12*e* are loaded into the guidance and control hardware and software system 30s of the respective UAVs 12*a*-12*e*. At operation 104 the UAVs 12-12*e* are deployed either from a terrestrial location or from an airborne platform. At operation 106, each UAV 12*a*-12*e* begins transmitting information (e.g., still images, streaming video, infrared still images or infrared streaming video, or audio) to the centralized monitoring station 18, along with system health information. If the UAVs 12 are operating fully autonomously, then wireless status signals (e.g., beacon signals or coded status signals) are transmitted by each UAV 12, at operation 108, to all other active UAVs, and each UAV 12 also begins receiving like wireless status signals from all the other UAVs so that each UAV 12 is able to monitor the status of all the other UAVs. If the UAVs 12 are operating semiautonomously, then each UAV12 will only need to wirelessly transmit its system health information to the central monitoring station 18. The central monitoring station 18 is able to determine if a problem exists with any of the UAVS from this information.

At operation 110, either the central monitoring station 18 or the onboard system 16 of each UAV 12 is used to determine if each of the UAVs is operating properly. If the central monitoring station 18 is performing this function, then this is accomplished by the computer control system 22 analyzing the structural health data being received from each of the UAVs 12. If the UAVs 12 are performing this function, then the status of each UAV 12 is determined by the information being generated by its structural health monitoring subsystem 46, which may be wirelessly transmitted to all other UAVs 12. If all of the UAVs 12 are operating as expected, then the received information from the sensors 38-44 onboard each of the UAVs 12 is displayed and/or processed at the central monitoring station 18, as indicated at operation 112. A check is then made if the UAV's 12 target detection and tracking subsystem 54 (FIG. 2) has detected a target or object that requires dedicated tracking, as indicated at operation 114. If not then operations 106-110 are then repeated. If the answer at inquiry 114 is "Yes", then the UAV 12 that detected the target or object may send a wireless signal to either the central monitoring station 18 or to all other UAVs 12 informing them of the situation. The central monitoring station 18 or the dynamic flight plan allocation subsystem 52 of the remaining UAVs 12 may then be used to determine the new needed flight plans for each of the other UAVs 12, as indicated at operation 116. The new flight plans for the other UAVs 12 may then be implemented, as indicated at operation 118.

If the check at operation 110 indicates a problem with any of the UAVs 12, then either the central monitoring station 18 or the dynamic flight plan allocation subsystem 52 on each of the UAVs 12 is used to generate the new flight plans that are to be used by the UAVs that remain in service, as indicated at operation 116. At operation 118 the new flight plans are implemented by the UAVs 12, and then operations 106-110 are performed again.

The system 10 and method of the present disclosure is expected to find utility in a wide variety of military and civilian applications. Military applications may involve real time battlefield monitoring of individual soldiers as well as the real time monitoring of movements (or the presence or absence) of friendly and enemy assets, or the detection of potential enemy targets. Civilian applications may are expected to involve the real time monitoring of a border areas, highways, or large geographic regions. In this regard, it is expected that if airborne mobile vehicles are employed, that fixed wing unmanned vehicles may be preferable because of the flight speed advantage they enjoy over unmanned rotorcraft. Where large geographic regions must be monitored with a high degree of persistence, it is expected that such fixed wing unmanned aircraft may be even more effective than unmanned rotorcraft for this reason.

Other non-military applications where the system 10 and method of the present disclosure is expected to find utility may involve the persistent monitoring of stadiums, public parks, public rallies or assemblies where large numbers of individuals congregate over large geographic areas, tourist attractions and theme parks.

Still other anticipated applications may involve search and rescue operations in both military and non-military applications. Non-military search and rescue operations for which the system 10 and methodology of the present disclosure is ideally suited may involve search and rescue operations during forest firefighting operations, monitoring of flooded areas for stranded individuals, lost individuals in mountainous areas, etc., The system 10 may also be used to monitor essentially any moving object (or objects or targets) within a geographic area. Since the UAVs are relatively small and inconspicuous, monitoring may be carried out in many instances without the presence of the UAVs even being detected or noticed by ground based persons. The relatively small size of the UAVs also makes them ideal for military implementations where avoiding detection by enemy radar is an important consideration. The use of the UAVs of the present system 10 also eliminates the need for human pilots, which may be highly advantageous for applications in warfare or where the UAVs will be required to enter areas where chemical or biological agents may be present, where smoke or fires are present, or other environmental conditions exist that would pose health or injury risks to humans.

The system 10 and method of the present disclosure also has the important benefit of being easily scalable to accommodate monitoring operations ranging from small geographic areas of less than a mile in area, to applications where large geographic areas covering hundreds or even thousands of square miles need to be under constant surveillance. The system 10 and method of the present disclosure enables such large areas to be continuously surveyed with considerably less cost than would be incurred if human piloted air vehicles were employed or if remote control pilots were needed to control remote vehicles.

Still further, the system 10 and method of the present disclosure can be used to monitor other in-flight aircraft to determine or verify if all external flight control elements of the in-flight aircraft are operating properly. The system 10 can also be used to help diagnose malfunctioning subsystems of the in-flight aircraft.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for monitoring a geographic area, comprising:

using a plurality of unmanned mobile vehicles;

prior to use, programming each said unmanned mobile vehicle with a first operational plan to cover a first specific subregion of said geographic area, and a second operational plan to cover a second, specific subregion of said geographic area;

using each said unmanned mobile vehicle to obtain visual images of said specific subregion that each said unmanned vehicle has been programmed to cover;

using a structural health monitoring system carried by each one of said unmanned mobile vehicles to monitor a structural health of its associated said unmanned mobile vehicle;

upon a first one of the unmanned mobile vehicles experiencing a structural health event that degrades an ability of said first one of the mobile vehicles to follow said first operational plan, then:

communicating information to at least a second one of the plurality of unmanned mobile vehicles concerning a compromised health status of the first one of the unmanned mobile vehicles;

having at least said second one of said unmanned mobile vehicles dynamically change from using said first operational plan to using said second operational plan, in real time, the second operational plan enabling the second one of said plurality of unmanned mobile vehicles to cover at least a portion of a subregion that would have been covered by said first one of said plurality of unmanned mobile vehicles.

2. The method of claim 1, further comprising causing at least one of said plurality of unmanned mobile vehicles to wirelessly transmit said visual images obtained to a centralized monitoring station.

3. The method of claim 2, wherein causing each one of said plurality of unmanned mobile vehicles to wirelessly transmit said visual images comprises causing each said unmanned mobile vehicle to wirelessly transmit at least one of:

still color images;

still black and white images;

streaming color video;

streaming black and white video;

still infrared images; and streaming infrared video.

4. The method of claim 1, further comprising having each of said unmanned mobile vehicles dynamically change from using said first operational plan to using said second operational plan, in real time, when the first one of said plurality of unmanned mobile vehicles becomes inoperable, to enable remaining ones of the plurality of unmanned mobile vehicles to cooperatively cover the subregion that would have been covered by said first one of said unmanned mobile vehicles.

5. The method of claim 4, further comprising enabling an individual to remotely override a dynamically assigned flight plan for at least one of said plurality of unmanned mobile vehicles, with a different flight plan.

6. The method of claim 1, further comprising having a centralized control station monitor operation of said plurality of unmanned mobile vehicles and inform remaining ones of said plurality of unmanned mobile vehicles to use the second operational plan, and wherein the second operational plan includes a new flight plan for said remaining ones of said unmanned mobile vehicles.

7. The method of claim 1, wherein using a plurality of unmanned mobile vehicles comprises using a plurality of unmanned airborne mobile vehicles.

8. The method of claim 1, wherein using a plurality of unmanned mobile vehicles comprises using an unmanned mobile land vehicle.

9. The method of claim 1, wherein using each one of said plurality of unmanned mobile vehicles to obtain visual images comprises using a camera mounted on each one of said unmanned mobile vehicles.

10. The method of claim 1, further comprising using an audio pickup device with at least one of said plurality of unmanned mobile vehicles to obtain audio information from said subregion being covered by said at least one unmanned mobile vehicle.

11. The method of claim 1, wherein said visual images obtained from at least one of said plurality of unmanned mobile vehicles are wirelessly transmitted to a centralized monitoring station in real time for viewing on a display.

12. The method of claim 1, further comprising causing each one of said plurality of unmanned mobile vehicles to periodically wirelessly transmit a status condition message to at least one of:

a centralized monitoring station; and all other ones of said plurality of unmanned mobile vehicles.

13. The method of claim 1, further comprising using a tracking subsystem on at least one of said plurality of unmanned mobile vehicles to detect and track at least one of:

a specific object;

a specific target;

and having said plurality of unmanned mobile vehicles dynamically change from the first operational plan to a different operational plan, when needed, to enable at least one of said plurality of unmanned mobile vehicles to continuously begin tracking at least one of said detected specific object and said detected specific target, while enabling a remaining quantity of said plurality of unmanned mobile vehicles to continuing covering said geographic area.

14. A monitoring method for monitoring a geographic area, comprising:

using a plurality of airborne unmanned mobile vehicles;

prior to use, programming each said airborne unmanned mobile vehicle with a first operational plan to cover a first specific subregion of said geographic area, and a second operational plan to cover a second, specific subregion;

using each said airborne unmanned mobile vehicle to obtain visual images of said subregion that each said mobile platform has been programmed to cover during its operation;

causing each said airborne unmanned mobile vehicle to wirelessly transmit said images it obtains to a centralized monitoring station;

viewing each of said images on a display at said centralized monitoring station; and when at least one of said plurality of airborne unmanned mobile vehicles becomes inoperable, then having at least a remaining subplurality of said plurality of airborne unmanned mobile vehicles dynamically make a determination to use said second operational plan, said second operational plan enabling one or more of said remaining subplurality of said plurality of airborne unmanned mobile vehicles to cover said specific subregion that would have been covered by said at least one of said airborne unmanned mobile vehicles that has become inoperable; and enabling an individual located remote from said airborne unmanned mobile vehicles to remotely override a dynamically assigned flight plan implemented by at least one of said unmanned mobile vehicles, with a different flight plan.

15. The method of claim 14, wherein transmitting said images to a centralized monitoring station comprises transmitting said images to one of a terrestrial based, centralized monitoring station and an airborne centralized monitoring station.

16. The method of claim 14, further comprising causing each of said airborne unmanned mobile vehicles to monitor its associated said subregion for audio signals present in said subregion being monitored and transmitting said audio signals to said centralized monitoring station.

17. The method of claim 14, further comprising causing each of said airborne unmanned mobile vehicles to wirelessly communicate with one another and to detect when any one of said plurality of airborne unmanned mobile vehicles becomes inoperative.

18. The method of claim 17, further comprising causing each of said airborne unmanned mobile vehicles to dynamically change to said second operational plan without involvement of said centralized monitoring station.

19. The method of claim 14, wherein causing each said airborne unmanned mobile vehicle to wirelessly transmit images comprises causing each said airborne unmanned mobile vehicle to wirelessly transmit at least one of:

still color images;

still black and white images;

streaming color video;

streaming black and white video;

still infrared images; and streaming infrared video.

20. A surveillance system for monitoring a geographic area, comprising:

a plurality of autonomously operated unmanned mobile vehicles;

each of said unmanned mobile vehicles including an onboard structural health monitoring system, and a guidance control system that executes a first pre-stored operational plan to enable each said unmanned mobile vehicle to traverse a specific, assigned subregion of said geographic area; and each said onboard system further including a monitoring system to obtain at least one of:

visual images of said specific, assigned subregion associated with a given one of said unmanned mobile vehicles; and audio signals emanating from its associated said specific, assigned subregion associated with a given one of said unmanned mobile vehicles; and upon a given one of said autonomously operated unmanned mobile vehicles experiencing a structural health comprising event, then said onboard systems of at least a subplurality of said autonomously operated unmanned mobile vehicles being apprised of a change in an operational status of said given one autonomously operated unmanned mobile vehicle, and switching to a second, pre-stored operational plan, such that one or more of said subplurality of autonomously operated unmanned mobile vehicles operate to traverse a subregion associated with said given one of said autonomously operated unmanned mobile vehicles to enhance a persistent monitoring capability of said subplurality of autonomously operated unmanned mobile vehicles.

* * * * *